United States Patent [19]

Maxelon

[11] 4,397,694
[45] Aug. 9, 1983

[54] SPRAY NOZZLE ASSEMBLY FOR FILTER DEVICES

[75] Inventor: Rainer Maxelon, Raunheim, Fed. Rep. of Germany

[73] Assignee: Deutsche Texaco Aktiengesellschaft, Hamburg, Fed. Rep. of Germany

[21] Appl. No.: 220,802

[22] Filed: Dec. 29, 1980

[30] Foreign Application Priority Data

Dec. 28, 1979 [DE] Fed. Rep. of Germany ....... 2952666

[51] Int. Cl.³ .............................................. B08B 3/02
[52] U.S. Cl. ................... 134/151; 134/122 R; 239/557
[58] Field of Search ............... 134/122 R, 122 P, 151, 134/64 R, 64 P; 239/556, 557

[56] References Cited

U.S. PATENT DOCUMENTS

| 2,771,131 | 11/1956 | Hook et al. ..................... 239/556 X |
| 3,468,362 | 9/1969 | Burkhardt et al. ......... 134/122 R X |
| 4,116,383 | 9/1978 | Johnson .......................... 239/557 X |

*Primary Examiner*—Robert L. Bleutge
*Attorney, Agent, or Firm*—Carl G. Ries; Robert A. Kulason; Robert B. Burns

[57] ABSTRACT

A spray nozzle assembly for spraying washing liquid onto a moving surface of a filter cake. The respective spray nozzles are communicated with a pressurized source of wash liquid, and are arranged adjacent the filter cake in successive doubled rows. The latter are laterally aligned normal to the direction of the filter cake movement. Corresponding spray nozzles of the respective rows are so aligned to define a plurality of nozzle lines which deviate from a parallel relationship with the path of travel of said filter cake.

4 Claims, 2 Drawing Figures

SPRAY NOZZLE ASSEMBLY FOR FILTER DEVICES

BACKGROUND OF THE INVENTION

Spray nozzle devices of the type generally contemplated are used commercially to wash wax from rotary cellular vacuum drum filters, rotary pressure filters, or belt-pan type filters. Usually the wash liquid is applied to one or more surfaces of a rotating filter cake through an arrangement of spray nozzles which are connected to a pressurized, liquid carrying distribution pipe.

For example, in rotary vacuum drum filters as are used in mineral oil dewaxing units, the filter washing agent is usually distributed onto the filter through a series of wash pipes. The latter are preferably positioned parallel to the drum axis, each wash pipe being fitted with twenty to forty nozzles. The latter are directed toward the filter surface to impinge a series of high velocity washing liquid streams thereagainst.

In the stated construction, the nozzle rows are usually arranged vertically or normally to the direction of filter rotation. The number of nozzle rows is preferably twice the number of the wash pipes, thus nozzles of adjacent even and odd numbered rows are aligned one directly behind the other. The nozzles thereby define a series of linear rows which run parallel to the rotational direction of the filter. Thus, pairs of even numbered and odd numbered nozzles define a double row.

Washing the filter in a normal manner will result in a substantially nonuniform treatment of the surface thereof. The wash surface will usually be characterized by a series of parallel striped areas which have been sufficiently treated, in contrast to the striped areas adjacent thereto which have not been contacted by adequate washing liquid.

Among the forms of nozzles which are typically applied to the present apparatus are the well jet, full jet type, or even special nozzles can be used. Although good spraying patterns can be achieved with different types of nozzles, these patterns provide scant information regarding liquid distribution on the wash surface.

If the amount of washing agent which is emitted by a nozzle, is integrated over the nozzle's sprayed circular segment, to determine the distribution of the liquid on the moving cake, it will be noted that the washed surface is unevenly sprayed. Further, the intensity of washing will vary within the width of a jet cone.

In addition, the nozzle's spraying angle and the distribution of liquid in the spraying pattern on the filter, depend on the fluid pressure source as well as on the quantity of the fluid used.

In the instance of a rotary drum filter such as that illustrated in FIG. 2, for "n" number of nozzle rows and the nozzle aligned arrangement as described above, the filter surface area which is sprayed by the individual nozzles, covers the filter surface n/2 times. Therefore, within the nozzle spraying pattern, these quantities, deviating from the mean value of the minimum and maximum quantities, are additive by a factor of the number of "n" lines of nozzles or n/2.

Consequently, when passing across the washing zone, some segments of the filter cake are contacted repeatedly with large amounts of washing medium. Other segments of the filter (on the other hand) are sprayed repeatedly with a paucity of wash liquid.

The uneven distribution of the washing fluid caused by the usual arrangement of nozzles results in surplus wash liquid running unused down some areas of the filter drum. In addition, channeling occurs, a phenomena wherein wash liquid penetrates areas of the filter cake that offer less resistance to penetration.

Other areas of the filter cake receive smaller quantities of washing medium due to their resistance to liquid penetration. In summary, a considerable quantity of the wash liquid is uselessly wasted due to the spotty overdosage of some areas and the insufficient washing of other filter areas.

The prior art teaches that to insure all areas of the filter cake being sufficiently washed when the usual nozzle arrangement is used, it is necessary to furnish an excessive amount of wash liquid.

Also, washing of the filter in the normal manner will result in non-uniform treatment. The filter surface as herein noted will be characterized by a series of striped areas which have been sufficiently treated, in contrast to striped areas adjacent thereto which have not been sufficiently treated.

It is therefore an object of the invention to provide a filter washing apparatus including a plurality of nozzles that will effectively and efficiently treat the filter surface. A further object of the invention is to provide a filter washing nozzle assembly which minimizes the amount of cleaning, or wash liquid which is required to adequately treat a filter surface. A still further object is to provide a nozzle array or a filter washing member, which is capable of uniformly treating a moving filter surface.

The above noted problem endemic to filter cake treating or washing, is overcome by the instant invention through a unique arrangement of the liquid carrying nozzles. The latter are positioned in such manner that the respective nozzles in any double row thereof, are positioned in staggered arrangement relative to succeeding double rows. Further, such arrangement is disposed transversely to the direction of movement or the rotation of the filter cake.

Within any double row of nozzles, the distances between individual spray nozzles is constant. The staggered nozzle arrangement with the double row, insures that wash liquid is sprayed uniformly across the width, and onto all areas of the filter cake. This nozzle array is found to utilize a minimum quantity of wash liquid while improving the washing efficiency of the entire unit.

Figure 1:
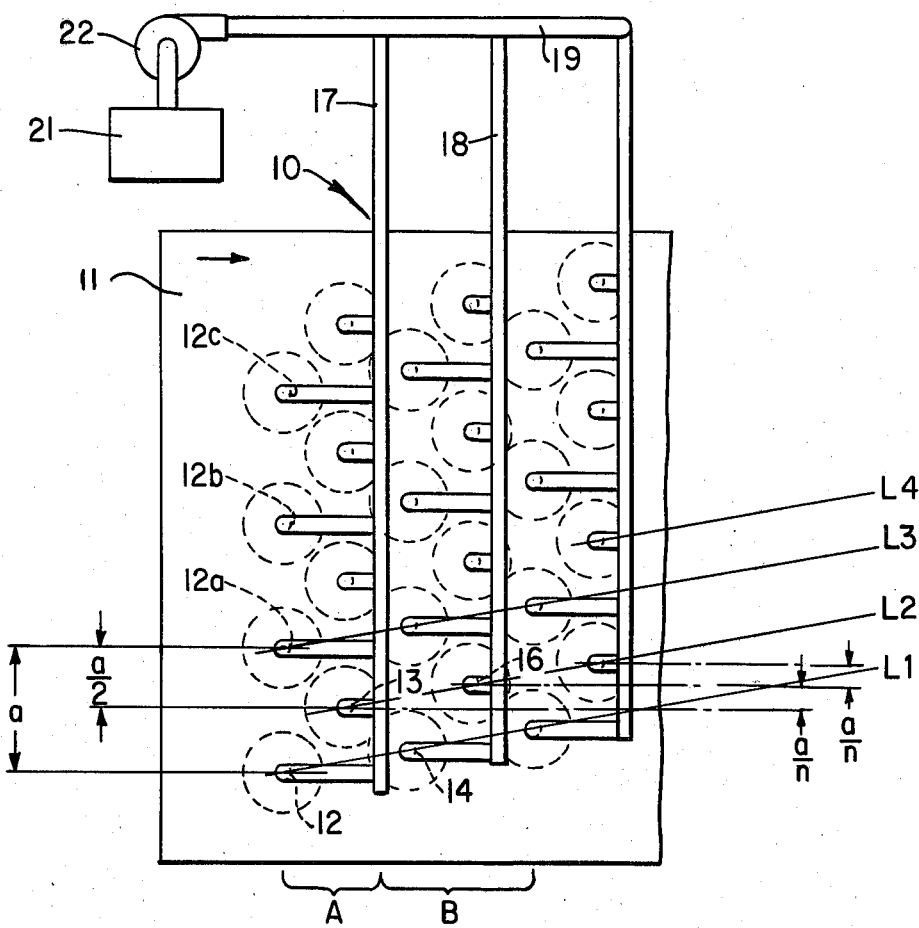
FIG. 1 is a schematic-like arrangement showing the instant nozzle pattern.
Figure 2:
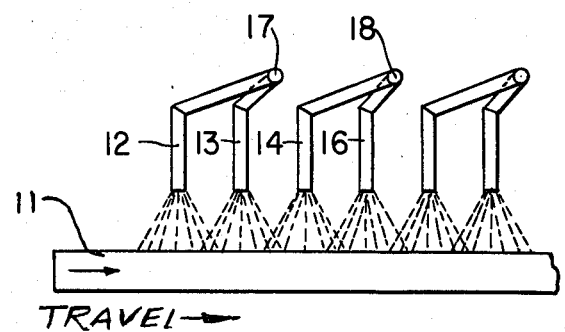
FIG. 2 is a side view of the nozzle positioned above the surface of a filter cake being treated.

Referring to FIG. 1, in a preferred embodiment of the invention, the apparatus for treating a filter cake is disposed in a manner to be fixed to, or displaceable from the filter holding unit. To achieve the desired relative motion between the spray nozzle apparatus 10 and the filter cake 11, the latter is mounted to progress along a constant travel path here indicated by the directional arrow.

Alternatively, if it is more convenient, the nozzle apparatus can be moved relative to the filter cake to achieve the desired washing action. For the purpose of the instant disclosure, filter 11 will be considered as a moving element relative to the stationary nozzle system or apparatus 10.

The nozzle array which is supported adjacent to filter cake 11 is comprised of a plurality of individual nozzles 12, 13, 14, and 16. Each of the nozzles being communicated, with and extends from a supply conduit such as 17 to receive washing liquid from the latter. The respective conduits 17 and 18 in turn are communicated through a common manifold 19 to a source 21 of the treating or washing liquid by a pump 22 or other liquid pressurizing member.

The nozzle array is arranged in a plurality of row pairs such as A & B which are disposed substantially normal to the path of travel indicated by the directional arrow. Each of said row pairs includes adjacently positioned primary and secondary rows, the aggregate number of nozzle rows for the purpose of the present arrangement is identified numerically as N in number. Said nozzle row arrangement is contingent to a large extent on the spray capability of the particular nozzles, and on the filter cake width.

Nozzles 12, 12a, 12b etc. carried on the liquid conduit 17, are equispaced in a lateral direction the spacing there-between being designated by the letter "a". Further, the primary and secondary rows of each row pairs the array, are spaced equally from adjacent nozzle rows to either side thereof.

To achieve the desired uniform spray pattern across the surface of a filter cake, 11, corresponding nozzles in adjacent primary and secondary rows are disposed in a series of discrete longitudinal lines. The latter are arranged to define lines $L_1$ $L_2$ $L_3$ & $L_4$ etc. with respect to the filter path of travel.

The factor of obliquity of the respective nozzle lines $L_1$ $L_2$ etc. bears a desired relationship to the total number of nozzles, and to the spacing thereof. This relationship is defined by the ratio of a/n, wherein "a" is the lateral spacing between nozzles 12, 12a etc., and "n" is the total accumulated number of nozzles rows.

As seen in FIG. 1, to achieve the desired uniformity liquid distribution, each nozzle such as 12a & 12b, is spaced a lateral distance "a" from the nozzle immediately adjacent thereto. Further, consecutive nozzles such as 12 & 13, in each row pair A & B are arranged a lateral distance of a/2 from its nearest adjacent nozzle.

The uniformity of nozzle spacing, results in the uniformity of the spray pattern delivered to the filter cake surface. Thus corresponding nozzles in the respective first, second, to a total of "n" nozzle rows is such that each nozzle is offset laterally from the adjacent nozzle by the distance of a/n.

The overall nozzle lateral spacing will be such as to avoid concentration of wash liquid in parallel lines along the filter cake 11. Rather, the offset arrangement will serve to assure that the filter cake surface receives a relatively uniform distribution of the wash liquid as the filter cake is progressed.

I claim:
1. Apparatus for treating a surface of a filter cake with a liquid, which apparatus includes:
   means to progress the filter cake along a constant travel path,
   a nozzle array disposed adjacent to said travel path including a plurality of nozzles, each of which is adapted to form a cone shaped liquid stream, and to deliver the liquid in a circular pattern against the surface being treated, each of said nozzles being communicated to a pressurized source of the treating liquid whereby to impinge said streams of the liquid against the surface of said moving filter cake, such that no liquid circular pattern intersects any other circular pattern, said nozzle array comprised of;
   a plurality of nozzle row pairs including spaced apart primary and secondary nozzle rows which extend substantially normal to the travel path, said rows being "n" in number;
   nozzles in each of said primary and secondary nozzle rows being spaced laterally equidistant apart in the amount of "a" inches,
   the respective primary and secondary nozzle rows of said row pairs being substantially equally spaced one from the other and,
   corresponding nozzles in each primary and secondary rows being disposed in singular alignment with each other to define discrete lines of obliquity with respect to said path of travel, as determined by the ratio of approximately a/n.

2. In a spray nozzle assembly as defined in claim 1 wherein the respective nozzles of the double rows are staggered at a distance of two adjacent nozzles divided by the total number of the existing nozzle rows.

3. Spray apparatus for spraying washing liquid against a filter cake, including a supply conduit communicated with a source of said washing liquid for supplying spray nozzles with wash liquid, said spray nozzles being arranged about the filter cake in a plurality of double rows disposed normal to the direction of the filter cake movement, the spray nozzles of the individual rows of a double row being provided in staggered arrangement, and the spray nozzles of all rows having equal distance one from the other, the improvement therein of said spraying nozzles of the double row being staggered in relation to those of an adjacent double row in the direction transversely to the direction of filter cake movement.

4. A spray nozzle assembly as defined in claim 3 wherein each nozzle row is communicated with wash liquid from a single conduit.

* * * * *